April 4, 1961
A. W. BLANSHINE
2,978,097
INFEED CONVEYOR
Filed Nov. 28, 1958
2 Sheets-Sheet 1
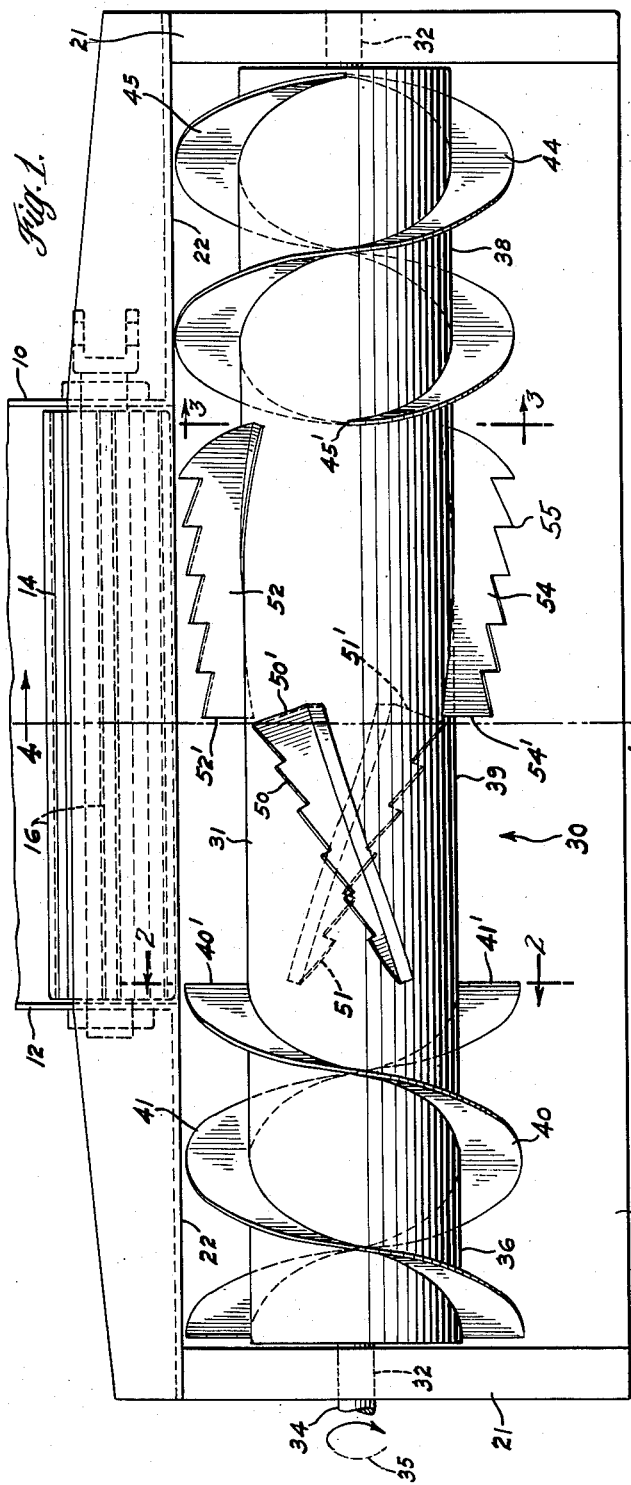
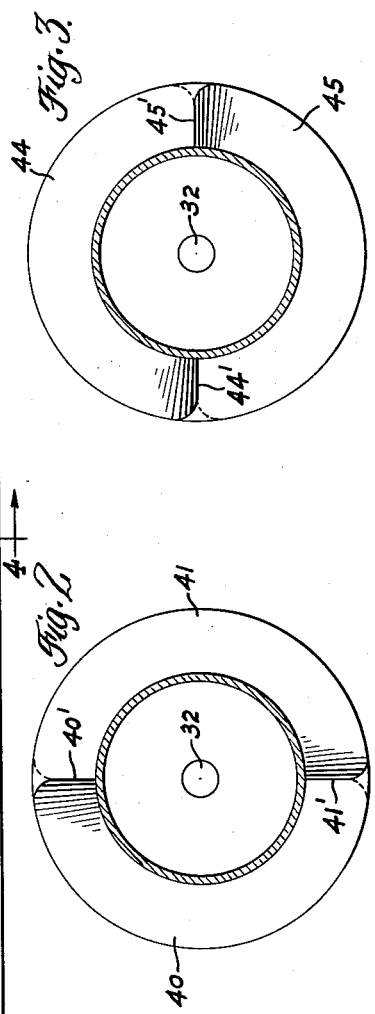
INVENTOR
ALLISON W. BLANSHINE
BY Joseph Allen Brown
ATTORNEY April 4, 1961 A. W. BLANSHINE 2,978,097
INFEED CONVEYOR Filed Nov. 28, 1958 2 Sheets-Sheet 2

INVENTOR
ALLISON W. BLANSHINE

By Joseph Allen Brown
ATTORNEY

United States Patent Office 2,978,097
Patented Apr. 4, 1961

2,978,097

INFEED CONVEYOR

Allison W. Blanshine, Lititz, Pa., assignor to Sperry Rand Corporation, New Holland, Pa., a corporation of Delaware Filed Nov. 28, 1958, Ser. No. 777,005

8 Claims. (Cl. 198—217)

The present invention relates generally to infeed mechanisms for agricultural machines. More particularly, the invention relates to an improved feed mechanism for farm implements having a housing opened forwardly and adapted to receive crop material delivered rearwardly.

When a forage harvester of the above type is used for harvesting alfalfa, for example, it is provided with a "header" adapted to receive a wide swath of material. Generally, the width of the opening into the housing is much less than the width of the header. Therefore, the material has to be laterally consolidated so that it can be fed through the opening. Frequently, auger conveyors are provided for this purpose. Generally, such conveyors comprise a tube having end sections extending on opposite sides of the housing opening and a central section registering with the opening. Each end section has helical flights which "auger" material to the central section and the central section has means, such as extendable and retractable fingers, for discharging material transverse to the axis of the auger conveyor and through the housing opening.

One object of this invention is to provide an infeed conveyor of the character described which will convey material in a continuous and even manner and more efficiently than similar conveyors of prior design.

Another object of this invention is to provide an auger conveyor of the character described which will carry out its function with less power than is required with prior auger conveyors.

Another object of this invention is to provide an auger conveyor of the character described which is of relatively simple construction enabling it to be manufactured at low cost.

Other objects of this invention will be apparent hereinafter from the specification and from the recital in the appended claims.

In the drawings:

Fig. 1 is a plan view of the infeed portion of a forage harvester and showing an auger conveyor constructed according to this invention;

Fig. 2 is a section taken on the line 2—2 of Fig. 1 and looking in the direction of the arrows;

Fig. 3 is a section taken on the line 3—3 of Fig. 1 and looking in the direction of the arrows;

Figure 4:
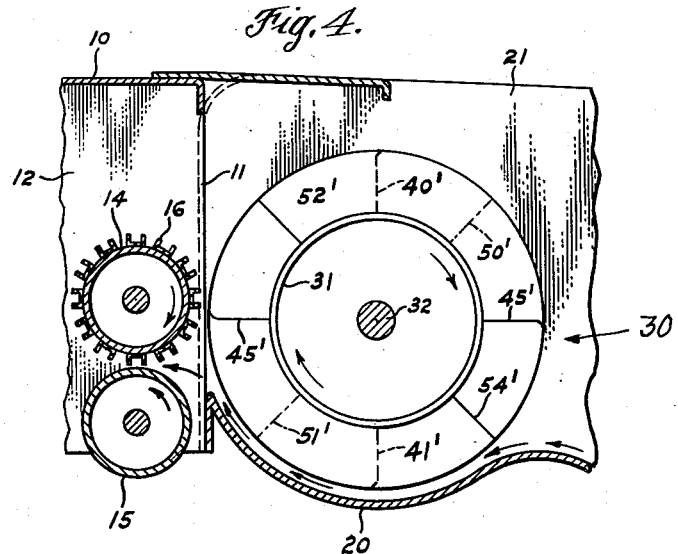
Fig. 4 is a longitudinal vertical section through the infeed mechanism and taken on the line 4—4 of Fig. 1, looking in the direction of the arrows.

Referring now to the drawings by numerals of reference and particularly to Figs. 1 and 4, 10 denotes a housing having a forwardly directed opening 11 adapted to receive crop material delivered rearwardly. Housing 10 has relatively spaced vertical side walls 12 which support a pair of transverse, compressing feed rolls, namely, upper roll 14 and lower roll 15. Upper roll 14 has longitudinally extending serrated slats 16 to provide an aggressive feeding action. Lower roll 15 has a relatively smooth periphery. Means, not shown, is provided for rotating the rolls in opposite directions to produce a feeding action therebetween. The crop material is compressed into a horizontal ribbon which is acted upon, after it leaves the rolls, by a chopper, not shown, which comminutes the material and then discharges it to a suitable receptacle.

Disposed in front of housing 10 and extending laterally thereof to both sides of opening 11 is crop receiving structure comprising a trough or base 20, relatively spaced, vertical side walls 21 and forwardly facing vertical rear walls 22, as shown. Positioned in front of trough 20 is cutting means, not shown, which severs the standing crop, after which the crop is deposited in the trough. Operable in trough 20 is an infeed conveyor 30 constructed according to this invention and adapted to first laterally consolidate the material and then discharge it rearwardly through the opening 11 to the rolls 14 and 15.

Conveyor 30 comprises a tube or body 31 having a shaft 32 journaled at its ends in side walls 21. One end of shaft 32 has an outwardly projecting portion 34 which may be connected to a source of power, not shown, for rotating the conveyor as indicated by the arrow 35. Tube 31 has a pair of end sections 36 and 38 separated by a central section or feeding area 39. Each end section comprises the length of tube 31 extending in front of the adjacent rear wall 22. The central section 39 constitutes the portion of the tube 31 directly in front of the housing 10.

Section 36 has two helical flights 40 and 41 wound around tube 31 and being 360° in extent. The respective flights 40 and 41 are spaced 180° apart, such flights having discharge ends 40' and 41' adjacent central section 39. The section 38 of the conveyor has a pair of helical flights 44 and 45 oppositely wound relative to the flights on section 36. Flights 44 and 45 are spaced 180° apart and extend 360° around the end section 38. Each flight has a discharge end denoted 44' and 45', respectively.

The flights on the respective ends of conveyor 30 deliver crop material toward central section 39 when the conveyor is rotated as indicated by arrow 35. As stated, the pairs of helical flights on the respective end sections are relatively spaced 180° apart whereby each flight on each end section discharges into a different area of the central section 39 than its associated flight. Also, the discharge ends 40'—41' of flights 40—41 are angularly spaced 90° from the discharge ends 44'—45' of flights 44—45. Therefore, there is a discharge end of a flight every 90° around tube 31.

Affixed to central section 39 are four deflectors 50, 51, 52 and 54. Each deflector extends angularly relative to the axis of the conveyor 30. Two of the deflectors, 50 and 51, are disposed adjacent section 36, the deflectors being spaced 180° apart relative to each other and having discharge ends 50' and 51' which are spaced 45° from the discharge ends 40' and 41'. The deflectors 52 and 54 are disposed adjacent section 38 of conveyor 30. These deflectors are spaced apart 180° relative to each other and their discharge ends 52' and 54' are spaced 45° from the discharge ends 44' and 45' of the flights 44 and 45.

Thus, there is a conveyor flight discharge end every 90° and a deflector discharge end every 90°, the deflectors and flights being angularly spaced 45° apart whereby there is a discharge of material every 45° around the conveyor or eight, successively operative conveying elements.

The deflectors on central section 39 engage the material coming from the conveyor flights and "bat" it radially rearwardly toward housing 10. The angular extension of each deflector is such that it likewise tends to convey material toward the center of the conveyor 30. Each deflector has a plurality of teeth 55 which permit the passage of material towards the center of the conveyor but resist the movement of material towards the ends of the conveyor. Moreover, each deflector is inclined rearwardly relative to the direction of rotation of the conveyor whereby material is pushed radially relative to the axis of the conveyor, there being no tendency for the material to hang on the deflectors.

Figure 5:
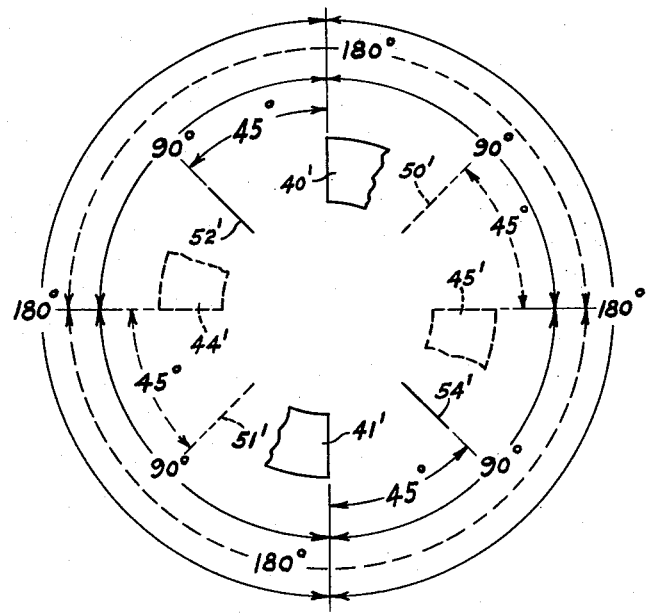
Fig. 5 shows a chart illustrating the design and operation of the infeed conveyor.

Referring to the chart in Fig. 5, it will be readily seen that the discharge ends 40'—41' of the flights 40 and 41 are 180° apart. Likewise, the discharge ends 44'—45' of the flights 44 and 45 are 180° apart. Further, the discharge ends of flights 40—41 are spaced 90° from the discharge ends of flights 44—45. The discharge end 50' of deflector 50 is disposed between the discharge ends 40' and 45' of flights 40—45. The discharge end 54' is disposed between the discharge ends 45' and 41' of flights 45 and 41. The discharge end of deflector 51' is between discharge ends 41' and 44' of flights 41 and 44. Finally, the discharge end of the deflector 52' is between the discharge ends 44' and 40' of flights 44 and 40.

With the discharge of material from the conveyor flights every 90°, there is a smooth continuous flow of material into the central section 39. When the material reaches such section, the relatively angularly spaced deflectors, 90° apart, successively come into operation to engage the material and convey it into the housing 10. Thus, all eight conveying elements successively operate producing a smooth and continuous flow of material. Since the elements work in cooperation with each other, the power requirement is low.

While this invention has been described in connection with a particular embodiment thereof and a particular use, it will be understood that it is capable of further modification, and other uses. For example, the conveyor could be used on a combine as well as on a forage harvester. This application is intended to cover any variations, uses or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A conveyor for crop material comprising a rotatable tube having two end sections separated by a central section, two flights on and extending the length of each end section and wound to deliver material to said central section, each flight having a discharge end at said central section, the discharge ends of the two flights on each end section being angularly spaced relative to each other and also angularly spaced relative to the discharge ends of the flights on the other end section whereby material is delivered to different angularly spaced areas of said central section, and a plurality of deflector members angularly spaced on and extending lengthwise along said central section, each deflector having a discharge end angularly spaced from the discharge ends of said flights.

2. A conveyor for crop material as recited in claim 1 wherein said plurality of deflectors are four in number, each deflector having a length shorter than the length of said central section, and two of said deflectors being disposed adjacent one end section of said tube and the other two deflectors being disposed adjacent the other end section of said tube.

3. A conveyor as recited in claim 2 wherein the discharge ends of said deflectors terminate at substantially the center of said central section.

4. A conveyor for crop material as recited in claim 1 wherein each of said deflectors has a series of crop material engaging teeth, said teeth being such that they permit relatively free movement of material toward the center of said central section and resist movement of material away from the center of said central section.

5. A conveyor for crop material comprising a rotatable tube having two end sections separated by a central section, two flights on and extending the length of each end section and wound to deliver material to said central section, each flight having a discharge end at said central section, the discharge ends of the two flights on each end section being angularly spaced relative to each other approximately 180° and also angularly spaced relative to the discharge ends of the flights on the other end section approximately 90° whereby each flight delivers material to a different angularly spaced area of said central section.

6. A conveyor for crop material comprising a rotatable auger having two parallel flights on substantially the same axial portion of the auger, the discharge end of one flight being angularly spaced from the discharge end of the other flight whereby material is delivered to angularly spaced locations relative to the axis of rotation of the auger; a pair of members mounted to receive material delivered by said two flights, means mounting said members to revolve about said auger axis in time with the auger rotation, said members being angularly spaced from each other and from said auger discharge ends whereby one flight delivers material in a continuous stream in front of one of said members and the other flight delivers material in a continuous stream in front of the other of said members.

7. A conveyor for crop material comprising a rotatable auger having two generally parallel coextensive flights on the same axial portion of the auger, the discharge ends of both flights being axially adjacent to each other but with one flight discharge end angularly spaced from the discharge end of the other flight whereby material is delivered to angularly spaced location about the axis of rotation of the auger, a pair of members located axially beyond said discharge ends of said flights and revolvable about said auger axis, said members being angularly spaced from each other and from said flight discharge ends whereby one flight delivers material in front of one of said members and the other flight delivers material in front of the other of said members, and common mounting means for said auger and said pair of members whereby when said auger rotates said pair of members revolve in fixed timed relation therewith.

8. A conveyor for crop material comprising a rotatable auger having two generally parallel coextensive flights on the same axial portion of the auger, the discharge ends of both flights being axially adjacent to each other but with one flight discharge end angularly spaced from the discharge end of the other flight whereby material is delivered to angularly spaced location about the axis of rotation of the auger, a pair of members located axially beyond said discharge ends of said flights and revolvable about said auger axis, said members being angularly spaced from each other and from said flight discharge ends whereby one flight delivers material in front of one of said members and the other flight delivers material in front of the other of said members, common mounting means for said auger and said pair of members whereby when said auger rotates said pair of members revolve in fixed timed relation therewith, said pair of members being so constructed that on engagement with material discharged from said auger flights they force the material radially relative to the auger axis.

References Cited in the file of this patent
UNITED STATES PATENTS

| | | |
|---|---|---|
| 265,078 | Hewitt | Sept. 26, 1882 |
| 2,315,091 | Fees | Mar. 30, 1943 |
| 2,464,919 | Carroll | Mar. 22, 1949 |
| 2,755,912 | Ashton | July 24, 1956 |